(12) United States Patent
Nagamoto et al.

(10) Patent No.: US 8,148,442 B2
(45) Date of Patent: Apr. 3, 2012

(54) PRESSURE SENSITIVE ADHESIVE FOR POLARIZING PLATES, POLARIZING PLATE WITH PRESSURE SENSITIVE ADHESIVE AND PRODUCTION PROCESS FOR POLARIZING PLATE

(75) Inventors: Koichi Nagamoto, Saitama (JP); Mikihiro Kashio, Saitama (JP); Eiko Kozukue, Saitama (JP); Kazuhiro Kon, Saitama (JP); Tadashi Matano, Chiba (JP)

(73) Assignee: Lintec Corporation, Tokyo (JP)

( * ) Notice: Subject to any disclaimer, the term of this patent is extended or adjusted under 35 U.S.C. 154(b) by 600 days.

(21) Appl. No.: 11/312,772

(22) Filed: Dec. 21, 2005

(65) Prior Publication Data
US 2006/0162857 A1 Jul. 27, 2006

(30) Foreign Application Priority Data

Jan. 27, 2005 (JP) .................................. 2005-020304
Aug. 25, 2005 (JP) .................................. 2005-244880

(51) Int. Cl.
*C08L 33/08* (2006.01)
*C08L 33/04* (2006.01)
*C08J 3/28* (2006.01)
*B32B 7/12* (2006.01)
*G02F 1/1333* (2006.01)
*G02F 1/1335* (2006.01)

(52) U.S. Cl. ............ 522/1; 522/114; 522/153; 524/543; 524/556; 524/560; 156/327; 428/355 RA; 428/355 EN; 349/96; 349/122

(58) Field of Classification Search ................... 522/120, 522/149, 153, 182, 178, 1, 114; 524/549, 524/543, 556, 560; 156/327; 428/355 RA, 428/355 EN; 349/96, 122

See application file for complete search history.

(56) References Cited

U.S. PATENT DOCUMENTS 5,308,886 A * 5/1994 Masuhara et al. ............... 522/81
5,905,099 A * 5/1999 Everaerts et al. ............. 522/126

(Continued)

FOREIGN PATENT DOCUMENTS

CN     1566244 A    1/2005

(Continued)

OTHER PUBLICATIONS

U.S. Appl. No. 11/611,947, filed Dec. 18, 2006, Nagamoto, et al.

(Continued)

*Primary Examiner* — Michael Pepitone
(74) *Attorney, Agent, or Firm* — Oblon, Spivak, McClelland, Maier & Neustadt, L.L.P.

(57) ABSTRACT

The disclosed a pressure sensitive adhesive for polarizing plates which has a storage elastic modulus (G') at 23° C. of at least 0.3 MPa; a polarizing plate having a pressure sensitive adhesive; a process for producing the above polarizing plate which comprises sticking a polarizing plate on a tacky adhesive material layer formed on a releasing layer of a releasing sheet, and thereafter irradiating with an active energy beam from the releasing sheet side; an optical film which comprises a polarizing plate and a phase difference plate; and a process for producing the above optical film. The pressure sensitive adhesive and polarizing plate having the pressure sensitive adhesive are characterized in that they are capable of sticking with high durability, the polarizing plate to a and phase difference plate, and the resultant liquid crystal display unit is less liable to cause light leakage under the conditions of high temperature.

24 Claims, 1 Drawing Sheet

U.S. PATENT DOCUMENTS

| | | | |
|---|---|---|---|
| 6,506,489 B1 * | 1/2003 | Ohura et al. | 428/343 |
| 6,524,701 B1 * | 2/2003 | Kondo et al. | 428/355 RA |
| 6,706,355 B2 * | 3/2004 | Holguin et al. | 428/40.1 |
| 7,312,265 B2 * | 12/2007 | Wada et al. | 524/272 |
| 7,892,394 B2 * | 2/2011 | Sano et al. | 156/325 |
| 2001/0019766 A1 * | 9/2001 | Masuda et al. | 428/345 |
| 2005/0014879 A1 * | 1/2005 | Moroishi et al. | 524/261 |
| 2005/0202196 A1 * | 9/2005 | Katoh et al. | 428/40.1 |
| 2006/0043532 A1 * | 3/2006 | Senoo et al. | 257/618 |

FOREIGN PATENT DOCUMENTS

| | | |
|---|---|---|
| JP | 2000-109770 | 4/2000 |
| JP | 2003-114331 | 4/2003 |

OTHER PUBLICATIONS

U.S. Appl. No. 11/368,385, filed Mar. 7, 2006, Nagamoto, et al.

* cited by examiner

PRESSURE SENSITIVE ADHESIVE FOR POLARIZING PLATES, POLARIZING PLATE WITH PRESSURE SENSITIVE ADHESIVE AND PRODUCTION PROCESS FOR POLARIZING PLATE

BACKGROUND OF THE INVENTION

1. Field of the Invention

The present invention relates to a pressure sensitive adhesive for polarizing plates, a polarizing plate having a pressure sensitive adhesive, a process for the production of the polarizing plate, an optical film using the polarizing plate having a pressure sensitive adhesive and a process for the production of the optical film. More particularly, the present invention pertains to a pressure sensitive adhesive for polarizing plates which is preferably applied to polarizing plates, particularly to a polarizing plate integrated with a visual field angle-expansion film or the like, or a polarizing plate that is laminated with a phase difference plate, and which is characterized in that it is capable of sticking with high durability, the polarizing plate to a liquid crystal cell or a phase difference plate and, that a liquid crystal display unit to be obtained therefrom is less liable to cause light leakage even in an environment of high temperature and high humidity; to a polarizing plate having a pressure sensitive adhesive; to a process for producing the polarizing plate thereof; an optical film using the polarizing plate having the pressure sensitive adhesive; and a process for producing the optical film thereof.

2. Description of the Related Arts

There have heretofore been frequently caused such unfavorable situations that in the case of sticking a sheet composed of an organic material on an adherend such as glass, ceramics or a metal via a pressure sensitive adhesive, the sheet peels off at an end and/or brings about lifting or relief accompanying the lapse of time.

In order to solve the above-mentioned unfavorable situations, there is generally employed a strongly tacky adhesive material which is enhanced in pressure sensitive adhesive performance by increasing the molecular weight of the components constituting the pressure sensitive adhesive or enhancing crosslinking density. However, the use of the strongly tacky adhesive material, although enhances the holding power, makes the pressure sensitive adhesive incapable of no more following shrinkage and swelling of the sheet composed of an organic material by occurring under high temperature and high humidity conditions, thereby contributing to the occurrence of various troubles.

In this connection, some of optical parts are used by sticking a polarizing plate on a surface thereof, and are typically exemplified by a liquid crystal cell of a liquid crystal display unit (LCD). In the following, some description will be given of the liquid crystal display unit with reference to FIG. 1.

Figure 1:
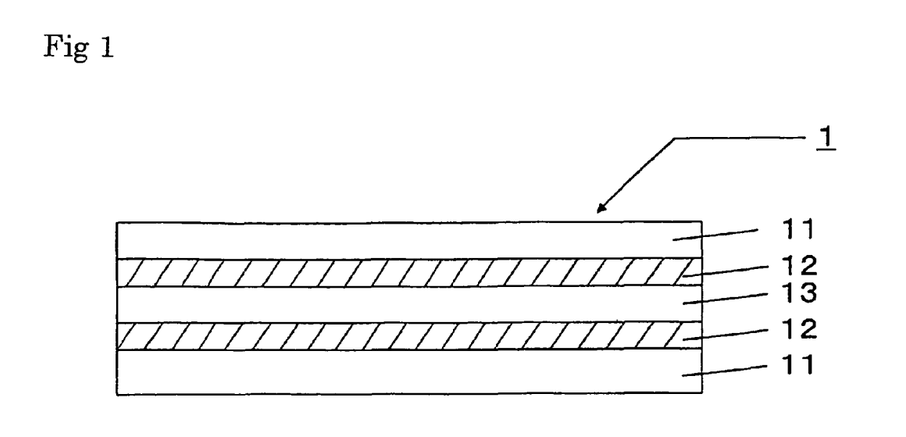
FIG. 1 is a schematic view showing a constitution of an LCD.

Liquid crystal cell 13 generally has such a structure that two transparent electrode substrates each forming an orientation layer are arranged so that the substrates are spaced at prescribed intervals with the orientation layers being located in the interior side, the perimeters of the substrates are sealed, a liquid crystal material is put in the above-mentioned intervals and polarizing plates 11, 11 are each placed on the two transparent electrode substrates via a pressure sensitive adhesive 12, 12. The above-mentioned polarizing plate generally comprises polarization films having three layer constitution in which optical isotropic films, for instance, triacetyl cellulose (TAC) films are stuck on both the sides of polyvinyl alcohol based polarizer. A pressure sensitive adhesive layer is formed on one side of the polarizing plate for the purpose of sticking the polarizing plate on an optical part such as a liquid crystal cell. As illustrated in a schematic drawing shown in FIG. 2, a phase difference plate 24 is installed as the case may be, between a polarizing plate 21 and a liquid crystal cell 23 via pressure sensitive adhesive 22, 25 in order to improve visual field angle characteristics.

In the case where the polarizing plate of the foregoing constitution is stuck on an optical part such as a liquid crystal cell, or the polarizing plate and a phase difference plate are stuck thereon, the resultant multi-layer structure of different materials brings about poor dimensional stability in terms of material properties, and particularly in an environment of high temperature and high humidity, gives rise to large dimensional variation due to shrinkage and swelling. Since the above-stated strongly tacky adhesive material is generally used as the pressure sensitive adhesive in the polarizing plate, it is possible to suppress lifting and peeling off which accompany dimensional variation of the polarizing plate, however it is impossible to absorb, in a pressure sensitive adhesive layer, the stress accompanying the dimensional variation of the polarizing plate, whereby the residual stress in the polarizing plate is made non-uniform. Consequently, problems are raised in that a TN cell and an STN cell are liable to appear so-called light leakage and color unevenness, respectively.

In order to solve the above-described problems, there is disclosed technology of imparting stress relaxation properties by adding, for instance, a low molecular weight body such as a plasticizer to the pressure sensitive adhesive so as to moderately soften the same (for instance, refer to Patent Literatures No. 1). Nevertheless, the addition of a low molecular weight body is responsible for adherend pollution in the case of peeling off the polarizing plate, besides leads to lowered holding power, and is more liable to give rise to lifting and peeling off that are due to the lapse of time.

Accordingly it has been the major subject to reconcile adhesion durability and light leakage preventability in a liquid crystal cell and the like.

Patent Literature No. 1: Japanese Patent Publication No. 3272921

SUMMARY OF THE INVENTION

It is an object of the present invention to provide under such circumstances, a pressure sensitive adhesive for polarizing plates which is preferably applied to polarizing plates, particularly to a polarizing plate integrated with a visual field angle-expansion film, or a polarizing plate that is laminated with a phase difference plate, and which is characterized in that it is capable of sticking with high durability, the polarizing plate on a liquid crystal cell or a phase difference plate and in that a liquid crystal display unit to be obtained is less liable to cause light leakage even in an environment of high temperature and high humidity; and the polarizing plate having the pressure sensitive adhesive.

Other objects of the present invention will become obvious from the text of the specification hereinafter disclosed.

In order to achieve the above-mentioned objects, intensive extensive research and investigation were accumulated by the present inventors. As a result it has been discovered that the objects can be achieved by a pressure sensitive adhesive having a specific storage elastic modulus (G'), and also that the above-described polarizing plate having a pressure sensitive adhesive can be produced in high efficiency by sticking the polarizing plate on a tacky adhesive material layer formed on a releasing layer of a releasing sheet, and conducting active energy beam irradiation from the side of the releasing sheet.

The present invention has been accomplished by the foregoing findings and information. That is to say, the present invention provides the following.

1. A pressure sensitive adhesive for polarizing plates which has a storage elastic modulus (G') at 23° C. of at least 0.3 MPa.
2. The pressure sensitive adhesive for polarizing plates as set forth in the preceding item 1, which has a storage elastic modulus (G') at 23° C. in the range of 0.3 to 15 MPa.
3. The pressure sensitive adhesive for polarizing plates as set forth in the preceding item 1 or 2, which has a storage elastic modulus (G') at 80° C. of at least 0.3 MPa.
4. The pressure sensitive adhesive for polarizing plates as set forth in the preceding item 3, which has a storage elastic modulus (G') at 80° C. in the range of 0.3 to 10 MPa.
5. The pressure sensitive adhesive for polarizing plates as set forth in any of the preceding items 1 to 4, which is used for sticking a polarizing plate on a liquid crystal glass cell.
6. The pressure sensitive adhesive for polarizing plates as set forth in any of the preceding items 1 to 4, which is used for sticking a polarizing plate on a phase difference plate.
7. The pressure sensitive adhesive for polarizing plates as set forth in any of the preceding items 1 to 6, wherein a tacky adhesive material containing (A) an acrylic copolymer and (B) an active energy beam-curable compound is irradiated with an active energy beam.
8. The pressure sensitive adhesive for polarizing plates as set forth in the preceding item 7, wherein an active energy beam-curable compound as the component (B) is a multi-functional (meth)acrylate based monomer having a molecular weight of less than 1000.
9. The pressure sensitive adhesive for polarizing plates as set forth in the preceding item 8, wherein the multi-functional (meth)acrylate based monomer has a cyclic structure.
10. The pressure sensitive adhesive for polarizing plates as set forth in any of the preceding items 7 to 9, wherein the ratio by mass of the component (A) to the component (B) is 100:1 to 100:100.
11. The pressure sensitive adhesive for polarizing plates as set forth in the preceding item 7, wherein the tacky adhesive material further comprises a crosslinking agent as the component (C).
12. The pressure sensitive adhesive for polarizing plates as set forth in the preceding item 7, wherein the tacky adhesive material further comprises a silane coupling agent as the component (D).
13. The pressure sensitive adhesive for polarizing plates as set forth in the preceding item 1, wherein the polarizing plate is constituted of a polarization film and a visual field angle expansion film that are integrated with each other.
14. The pressure sensitive adhesive for polarizing plates as set forth in the preceding item 1, which has an adhesive strength for alkali-free glass of at least 0.2 N/25 mm.
15. The pressure sensitive adhesive for polarizing plates as set forth in the preceding item 1, which has an adhesive strength for polycarbonate of at least 5 N/25 mm.
16. The pressure sensitive adhesive for polarizing plates as set forth in the preceding item 1, which has a gel fraction of at least 85%.
17. A polarizing plate which is having a pressure sensitive adhesive, wherein a layer composed of the pressure sensitive adhesive as set forth in the preceding item 1 is provided on the polarizing plate.
18. A process for the production of the polarizing plate which is having a pressure sensitive adhesive as set forth in the preceding item 17, which comprises sticking a polarizing plate on a tacky adhesive material layer formed on a releasing layer of a releasing sheet, and thereafter irradiating with an active energy beam from the releasing sheet side.
19. An optical film which comprises a polarizing plate and a phase difference plate, wherein said polarizing plate and said phase difference plate are stuck to each other with the pressure sensitive adhesive as set forth in the preceding item 1.
20. A pressure sensitive adhesive sheet which comprises two releasing sheets, wherein the pressure sensitive adhesive for polarizing plates as set forth in claim 1 is put between said releasing sheets so as to be in contact with releasing layer sides.
21. A process for the production of an optical film, which comprises sticking a polarizing plate and a phase difference plate to each other by the use of the pressure sensitive adhesive sheet as set forth in the preceding item 20.

BRIEF DESCRIPTION OF THE DRAWINGS

1, 2: liquid crystal display unit, 11, 12: polarizing plate, 12, 22, 25: pressure sensitive adhesive, 13, 23: glass (liquid crystal cell) 24; phase difference plate

DESCRIPTION OF THE PREFERRED EMBODIMENTS

It is necessary that the pressure sensitive adhesive for polarizing plates according to the present invention has a storage elastic modulus (G') at 23° C. of at least 0.3 MPa. A storage elastic modulus (G') at 23° C. thereof, when being at least 0.3 MPa, leads to sufficient light leakage preventability. The upper limit thereof is not specifically defined, but is preferably at most 50 MPa, more preferably at most 15 MPa in order to obtain a pressure sensitive adhesive having better adhesion durability. In view of the foregoing, the storage elastic modulus (G') at 23° C. thereof is particularly preferably in the range of 0.35 to 12 MPa. The storage elastic modulus (G') at 80° C. thereof is usually preferably at least 0.3 MPa, particularly preferably in the range of 0.3 to 10 MPa.

The above-mentioned storage elastic modulus (G') is measured by the method described hereunder.

<Method for Measuring Storage Elastic Modulus (G')>

A pressure sensitive adhesive (thickness of 30 μm) is laminated, and made into a columnar test piece measuring 8 mm in diameter by 3 mm in thickness, and the storage elastic modulus (G') is measured by torsional shear method under the following conditions.

Measuring instrument: dynamic viscoelastic modulus measuring instrument (manufactured by Rheometric Coropation under the trade name" DYNAMIC ANALYZER RDA II)

Frequency: 1 Hz

Temperature: 23° C., 80° C.

Moreover the pressure sensitive adhesive for polarizing plates according to the present invention has preferably an adhesive strength for alkali-free glass being at least 0.2 N/25 mm. An adhesive strength therefor being at least 0.2 N/25 mm makes it possible to stick a polarizing plate, for instance, on a liquid crystal glass cell with a sufficient adhesive strength. The adhesive strength therefor is more preferably 1.0 to 30 N/25 mm.

In addition, the adhesive strength for polycarbonate is preferably at least 5 N/25 mm. An adhesive strength therefor being at least 5 N/25 mm makes it possible to stick a polarizing plate, for instance, on a phase difference plate with a sufficient adhesive strength. The adhesive strength therefor is more preferably 10 to 50 N/25 mm. The method for measuring the adhesive strength will be described in detail hereinafter.

The pressure sensitive adhesive for polarizing plates according to the present invention which has the above-mentioned storage elastic modulus (G') and adhesive strength is preferably a pressure sensitive adhesive comprising a tacky adhesive material containing (A) an acrylic copolymer and (B) an active energy beam-curable compound, said tacky adhesive material being irradiated with an active energy beam. The acrylic copolymer as the component (A) is exemplified by (meth)acrylic ester based copolymer. The (meth)acrylic ester based copolymer as stated herein means both acrylic ester and methacrylic ester. Other similar terminologies shall be construed in the same manner.

As the (meth)acrylic ester based copolymer as mentioned above, there is used said copolymer having a crosslinking point which enables crosslinkage by means of any of various crosslinking methods. The (meth)acrylic ester based copolymer having a crosslinking point is not specifically limited, but may be properly optionally selected for use from the (meth)acrylic ester based copolymer which has hitherto been customarily employed as resinous component of pressure sensitive adhesive.

The (meth)acrylic ester based copolymer having such a crosslinking point is preferably exemplified by a copolymer of a (meth)acrylic ester wherein an alkyl group of ester moiety has 1 to 20 carbon atoms, a monomer having a crosslinkable functional group, and an other monomer to be used as desired. Examples of a (meth)acrylic ester wherein an alkyl group of ester moiety has 1 to 20 carbon atoms include methyl (meth)acrylate, ethyl(meth)acrylate, propyl(meth)acrylate, butyl(meth)acrylate, pentyl(meth)acrylate, hexyl(meth)acrylate, cyclohexyl(meth)acrylate, 2-ethylhexyl(meth)acrylate, isooctyl(meth)acrylate, decyl(meth)acrylate, dodecyl(meth)acrylate, myristyl(meth)acrylate, palmityl(meth)acrylate and stearyl(meth)acrylate. Any of the above-cited (meth)acrylic esters may be used alone or in combination with at least one other species.

On the other hand, the monomer bearing a crosslinkable functional group in the molecule preferably bears at least one of hydroxy group, carboxyl group, amino group and amide group, and is specifically exemplified by hydroxy alkyl(meth)acrylate such as 2-hydroxyethyl(meth)acrylate, 2-hydroxypropyl(meth)acrylate, 3-hydroxypropyl(meth)acrylate, 2-hydroxybutyl(meth)acrylate, 3-hydoxybutyl(meth)acrylate and 4-hydoxybutyl(meth)acrylate; acrylamides such as acrylamide, methacrylamide, N-methylacrylamide, N-methylmethacrylamide, N-methylolacrylamide and N-methylolmethacrylamide; (meth)acrylic acid monoalkyl aminoalkyl such as (meth)acrylic acid monomethyl aminoethyl, (meth)acrylic acid monoethyl aminopropyl, (meth)acrylic acid monomethyl aminopropyl and (meth)acrylic acid monoethyl aminopropyl; and ethylenically unsaturated carboxylic acids such as acrylic acid, methacrylic acid, crotonic acid, maleic acid, itaconic acid and citraconic acid. Any of the monomers may be used alone or in combination with at least one other species.

The polymerization type of the (meth)acrylic ester based copolymer to be used as the component (A) is not specifically limited, but may be any of random, block and graft copolymer. The molecular weight thereof is at least 500,000 in terms of weight average molecular weight, which is measured by gel permeation chromatography (GPC) and expressed in terms of polystyrene. When the weight average molecular weight thereof is at least 500,000, the adhesiveness to an adherend and adhesion durability are made sufficient without causing lifting or peeling off. Taking adhesiveness and adhesion durability into consideration, the weight average molecular weight thereof is in the range of preferably 600,000 to 2,000,000, more preferably 700,000 to 1,800,000.

In the (meth)acrylic ester based copolymer, the content of the monomer moiety bearing a crosslinkable functional group in the molecule is preferably in the range of 0.01 to 10% by mass. When the content thereof is at least 0.01% by mass, sufficient crosslinking and favorable durability are assured by the reaction with a crosslinking agent as will be described hereinafter. On the other hand, when the content thereof is at most 10% by mass, decrease in sticking adaptabilities on liquid crystal glass cells and phase difference plates which is caused by excessively high degree of crosslinking is preferably obviated. Taking into consideration the durability, sticking adaptabilities to liquid crystal glass cells and phase difference plates and the like factors, the content of the monomer moiety bearing a crosslinkable functional group is in the range of preferably 0.05 to 7.0% by mass, particularly preferably 0.2 to 6.0% by mass. The (meth)acrylic ester based copolymer may be used alone or in combination with at least one other species.

The active energy beam-curable compound to be used as the component (B) in the tacky adhesive material is preferably exemplified by multi-functional (meth)acrylate based monomers having a molecular weight of less than 1,000, which are enumerated by difunctional monomer such as 1,4-butanediol di(meth)acrylate, 1,6-hexanediol di(meth)acrylate, neopentylglycol di(meth)acrylate, polyethyleneglycol di(meth)acrylate, neopentylglycoladipate di(meth)acrylate, hydroxypivalic acid neopentylglycol di(meth)acrylate, dicyclopentanyl di(meth)acrylate, caprolactone-modified dicyclopentenyl di(meth)acrylate, ethylene oxide-modified phosphoric acid di(meth)acrylate, di(acryloxyethyl)isocyanurate and allylated cyclohexyl di(meth)acrylate, dimethyloldicyclopentane diacrylate, ethylene oxide-modified hexahydrophthalic acid diacrylate, tricyclodecane dimethanol acrylate, neopentyl glycol-modified trimethylolpropane diacrylate and adamantane diacrylate; trifunctional monomer such as trimethylolpropane tri(meth)acrylate, dipentaerythritol tri(meth)acrylate, prop ionic acid-modified dipentaerythritol tri(meth)acrylate, pentaerythritol tri(meth)acrylate, propylene oxide-modified trimethylolpropane tri(meth)acrylate and tris (acryloxyethyl)isocyanurate; tetrafunctional monomer such as diglycerine tetra(meth)acrylate and pentaerythritol tetra (meth)acrylate; pentafunctional monomer such as propionic acid-modified dipentaerythritol penta(meth)acrylate; and hexafunctional monomer such as caprolactone-modified dipentaerythritol hexa(meth)acrylate.

The multi-functional (meth)acrylate based monomer in the present invention may be used alone or in combination with at least one other species. Of these, it is preferable that the monomer contains a cyclic structure in its skeleton structure. The cyclic structure may be any of carbon cyclic structure and heterocyclic structure, and any of monocyclic structure and polycyclic structure.

Preferable examples of the multi-functional (meth)acrylate based monomers include those having isocyanurate structure such as di(acryloxyethyl)isocyanurate and tris(acryloxyethyl)isocyanurate, dimethyloldicyclopentane diacrylate, ethylene oxide-modified hexahydrophthalic acid diacrylate, tricyclodecane dimethanol acrylate, neopentyl glycol-modified trimethylolpropane diacrylate and adamantane diacrylate.

In addition, there is usable an active energy beam-curable acrylate based oligomer as the component (B). The acrylate based oligomer has preferably a weight average molecular weight of at most 50,000, and is exemplified by oligomers of polyester acrylate base, epoxy acrylate base, urethane acrylate base, polyether acrylate base, polybutadiene acrylate base, silicone acrylate base and the like.

The polyester acrylate based oligomer is obtainable by esterifying with (meth)acrylic acid, the hydroxy groups of a polyester oligomer which has hydroxy groups at both terminals and which is obtained, for instance, by condensation reaction of a polybasic carboxylic acid and a polyhydric alcohol, or the hydroxy group at an terminal of an oligomer which is obtained by adding an alkylene oxide to a polybasic carboxylic acid. The epoxy acrylate based oligomer is obtainable, for instance, by reacting (meth)acrylic acid with the oxirane rings of bisphenol type epoxy resin or novolac type epoxy resin each having a relatively low molecular weight to esterify the resin. There is also usable a carboxyl-modified epoxy acrylate oligomer in which the above-mentioned epoxy acrylate based oligomer is modified in part with a dibasic carboxylic acid anhydride. The urethane acrylate based oligomer is obtainable, for instance, by esterifying with (meth)acrylic acid, polyurethane oligomer which is obtained by the reaction between polyether polyol or polyester polyol and polyisocyanate. The polyol acrylate based oligomer is obtainable, for instance, by esterifying with (meth)acrylic acid, the hydroxy group of polyether polyol.

The weight average molecular weight of the above-mentioned acrylate based oligomer, which is expressed in terms of a standard poly(methyl methacrylate) and measured by GPC, is selected so as to be preferably at most 50,000, more preferably in the range of 500 to 50,000, particularly preferably in the range of 3,000 to 40,000, The acrylate based oligomer may be used alone or in combination with at least one other species.

In the present invention, there is usable an adduct acrylate based polymer wherein a group bearing a (meth)acryloyl group is introduced in side chains as the component (B). Such adduct acrylate based polymer is obtainable by the use of the copolymer of (meth)acrylic ester and the monomer having a crosslinkable functional groups in the molecule, which copolymer has been described in the foregoing (meth)acrylic ester based copolymer as the component (A), specifically by reacting a compound bearing a (meth)acryloyl group and a group which react with crosslinkable functional group, with part of the crosslinkable functional groups of the above-mentioned copolymer. The weight average molecular weight of the adduct acrylate based polymer is usually in the range of 500,000 to 2,000,000 expressed in terms of polystyrene.

In the present invention, one or two species in combination may be properly optionally selected for use as the component (B) from among the above-mentioned multifunctional acrylate based monomer, acrylate based oligomer and adduct acrylate based polymer.

In the present invention, the ratio by mass of the content of the acrylic copolymer as the component (A) to the content of the active energy beam-curable compound as the component (B) is preferably 100:1 to 100:100, more preferably 100:5 to 100:50, particularly preferably 100:10 to 100:40.

In the case where the pressure sensitive adhesive according to the present invention contains the above-mentioned components (A) and (B), the storage elastic modulus (G') after the irradiation of an active energy beam satisfies the foregoing requirement. That is to say, it is preferable that the storage elastic modulus (G') at 23° C. is at least 0.3 MPa and the storage elastic modulus (G') at 80° C. is at least 0.3 MPa.

It is possible as desired to allow the above-mentioned tacky adhesive material to contain a photopolymerization initiator, which is exemplified, for instance, by benzoin, benzoin methyl ether, benzoin ethyl ether, benzoin isopropyl ether, benzoin-n-butyl ether, benzoin isobutyl ether, acetophenone, dimethylaminoacetophenone, 2,2-dimethoxy-2-phenylacetophenone, 2,2-diethoxy-2-phenylacetophenone, 2-hydroxy-2-methyl-1-phenylpropane-1-one, 1-hydroxycyclohexyl phenylketone, 2-methyl-1-[4-(methylthio)phenyl]-2-morpholyno-propane-1-one, 4-(2-hydroxyethoxy)phenyl-2-(hydroxy-2-propyl)ketone, benzophenone, p-phenylbenzophenone, 4,4'-diethylaminobenzophenone, dichlorobenzophenone, 2-methyl anthraquinone, 2-ethyl anthraquinone, 2-tertiallybutyl anthraquinone, 2-amino anthraquinone, 2-methyl thioxanthone, 2-ethyl thioxanthone, 2-chloro thioxanthone, 2,4-dimethyl thioxanthone, 2,4-diethyl thioxanthone, benzyl dimethyl ketal, acetophenone dimethyl ketal, p-dimethylamino benzoic ester, oligo[2-hydroxy-2-methyl-1[4-(1-methylvinyl)phenyl]propane, and 2,4,6-trimethylbenzoyl-diphenyl-phosphine oxide. The above-enumerated species may be used alone or in combination with at least one other species. The blending amount is usually selected in the range of 0.2 to 20 parts by mass based on 100 parts by mass of the component (B).

It is possible as desired to allow the tacky adhesive material to contain a crosslinking agent as the component (C), which is not specifically limited, but may be properly optionally selected for use from among the crosslinking agents that have heretofore been customarily employed. Preferable examples of the crosslinking agents include polyisocyanate compounds, epoxy resin, melamine resin, urea resin, dialdehydes, methylol polymer, aziridine based compounds, metallic chelate compounds, metal alkoxisides and metallic salts. Of these, polyisocyanate compounds are preferably used. Examples of the polyisocianate compounds include aromatic polyisocianate such as tolylenediisocianate, diphenylmethanediisocianate and xylylenediisocianate; aliphatic polyisocianate such as hexamethylenediisocianate; and alicyclic polyisocianate such as isophoronediisocianate and hydrogenated diphenylmethanediisocianate; their biuret bodies, isocyanurate bodies and adduct bodies that are the reaction products with a hydrogen-containing low molecular compounds such as ethylene glycol, propylene glycol, neopetyl glycol, trimethylol propane and castor oil.

In the present invention, the crosslinking agent may be used alone or in combination with at least one other species. The amount thereof to be used, which depends upon the type of the crosslinking agent, is in the range of usually 0.01 to 20 parts by mass, preferably 0.1 to 10 parts by mass based on 100 parts by mass of the acrylic copolymer as the component (A).

It is possible as desired to allow the tacky adhesive material to contain a silane coupling agent as the component (D), whereby the adhesivity between a pressure sensitive adhesive and a glass cell is made more favorable in the case of sticking a polarizing plate, for instance, on a liquid crystal glass cell or the like. The silane coupling agent, which is an organosilicon compound bearing at least one alkoxysilyl group in the molecule, is preferably well compatible with a pressure sensitive adhesive component, imparted with light transmittance, and substantially transparent. The amount thereof to be added is in the range of preferably 0.001 to 10 parts by mass, particularly preferably 0.005 to 5 parts by mass based on 100 parts by mass of the solid content of the tacky adhesive material.

Specific examples of the above-mentioned silane coupling agents include polymerizable unsaturated group-containing silicon compounds such as vinyltrimethoxysilane, vinyltriethoxysilane and methacryloxypropyltrimethoxysilane; silicon compounds having an epoxy structure such as 3-glycidoxypropyltrimethoxysilane and 2-(3,4-epoxycyclohexyl) ethyl trimethoxysilane; amino group-containing silicon compounds such as 3-aminopropyltrimethoxysilane N-(2-aminoethyl)-3-aminopropyltrimethoxysilane; and N-(2-aminoethyl)-3-aminopropylmetyldimethoxysilane; and 3-chloropropyltrimethoxysilane.

The silane coupling agent may be used alone or in combination with at least one other species.

The tacky adhesive material may be incorporated as desired with any of well known additives that have heretofore been usually used in acrylic pressure sensitive adhesive to the extent that the objects of the present invention are not impaired thereby. The additives are exemplified, for instance, by tackifying agents, antioxidants, ultraviolet absorbers, light stabilizers, softening agents, fillers and the like.

The pressure sensitive adhesive for polarizing plates according to the present invention is formed by irradiating the tacky adhesive material obtained in the above-stated manner with an active energy beam.

The active energy beam is exemplified by ultraviolet ray and electron beam. The ultraviolet ray is obtained from a high-pressure mercury lamp, an electrodeless lamp, a xenon lamp and the like, on the other hand, electron beam is obtained from an electron beam accelerator or the like. Of the active energy beam, ultraviolet ray is particularly preferable. In the case of using electron beam, a pressure sensitive adhesive can be formed without the use of the photopolymerization initiator.

The irradiation quantity for the tacky adhesive material is properly optionally selected so as to obtain a crosslinked pressure sensitive adhesive imparted with said storage elastic modulus and the adhesive strength for alkali-free glass and polycarbonate. It is preferable that in the case of ultraviolet ray, the illuminance is 50 to 1000 mW/cm$^2$ and light quantity is 50 to 1000 mJ/cm$^2$, and in the case of electron beam, the absorbed dose is 10 to 1000 krad.

The pressure sensitive adhesive for polarizing plates according to the present invention can be applied to a polarizing plate composed only of a polarization film, and used for sticking the polarizing plate, for instance, to a liquid crystal glass cell, while in particular, it can be preferably applied to a polarizing plate in which a polarization film and a visual field angle-expansion film are integrated with each other, and used for sticking the polarizing plate, for instance, on a liquid crystal glass cell.

The polarizing plate in which a polarization film and a visual field angle-expansion film are integrated with each other is exemplified, for instance, by a polarization film which is composed of a polyvinyl alcohol based polarizer and a triacetyl cellulose (TAC) film stuck on both the sides thereof, and further composed of a visual field angle-expanding function layer comprising a discotic liquid crystal which is formed by coating on one side of the polarization film, the polarization film same as the foregoing except that the visual field angle-expansion function film is stuck with an adhesive. In these cases, the pressure sensitive adhesive is formed on the side of the above-mentioned visual field angle-expansion function layer or visual field angle-expansion film.

Figure 2:
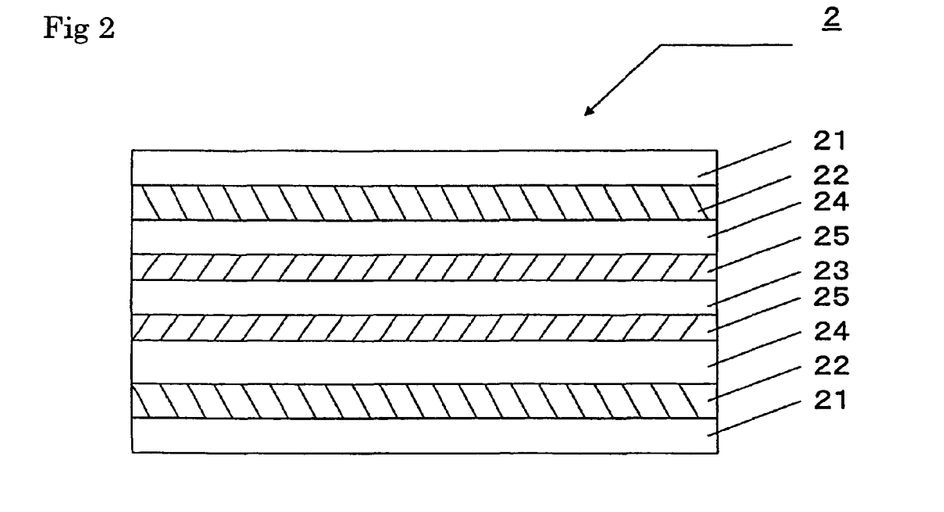
FIG. 2 is another schematic view showing a constitution of an LCD.

Further in the case where a phase difference plate is put between the polarizing plate and the liquid crystal glass cell as illustrated in FIG. 2, the pressure sensitive adhesive for polarizing plates according to the present invention is suitably usable. That is to say, the polarizing plate composed only of a polarization film and a phase difference plate are stuck with the pressure sensitive adhesive according to the present invention to produce an optical film, and the phase difference plate of the resultant optical film and a liquid crystal glass cell are stuck on each other by means of a pressure sensitive adhesive. The pressure sensitive adhesive is not specifically limited, but may be selected for use from among the pressure sensitive adhesives that are usually used for sticking a polarizing plate and a liquid crystal glass cell. Specific examples thereof include a tacky adhesive material composed of an acrylic copolymer, crosslinking agent and silane coupling agent as disclosed in Japanese Patent Application Laid-Open No. 131033/1999 (Heisei 11). Moreover the pressure sensitive adhesive according to the present invention is also usable for sticking the polarizing plate and the liquid crystal glass cell.

The pressure sensitive adhesive according to the present invention has preferably a gel fraction of at least 85%. That is to say, in the case of a small amount of low molecular weight components to the extent of being extracted with an organic solvent, high durability and stability are assured by a pressure sensitive adhesive which has a gel fraction of at least 85% and which is less liable to cause lifting, peeling off and/or pollution of adherend in an environment of being heated or warmed. The gel fraction is preferably in the range of 90 to 99.9%.

A liquid crystal display unit which is produced by sticking the polarizing plate to the liquid crystal glass cell or the phase difference plate in the above-mentioned manner by the use of the pressure sensitive adhesive for polarizing plates according to the present invention is less liable to light leakage even in an environment of high temperature and high humidity and besides is excellent in adhesion durability between the polarizing plate and the liquid crystal glass cell.

The present invention further provides a polarizing plate which is having a pressure sensitive adhesive by having thereon, a layer comprising the pressure sensitive adhesive for polarizing plates according to the present invention. The polarizing plate may be composed only of a polarization film as mentioned hereinbefore, but in the case of the constitution as illustrated in FIG. 1, the polarizing plate and visual field angle-expansion film are preferably integrated with each other.

The thickness of the layer composed of the above-mentioned pressure sensitive adhesive for polarizing plates is in the range of usually about 5 to 100 μm, preferably 10 to 50 μm, more preferably 10 to 30 μm.

The process for the production of the polarizing plate having a pressure sensitive adhesive needs only to be a method enabling to obtain a polarizing plate on which the pressure sensitive adhesive according to the present invention is formed without specific limitation.

According to the process of the present invention as described hereunder, it is possible to produce desirable polarizing plate having a pressure sensitive adhesive in high efficiency.

In the process of the present invention, a polarizing plate is stuck on a tacky adhesive material layer which has been formed on a releasing layer of a releasing sheet, and thereafter the tacky adhesive material is irradiated with an active energy beam from the side of releasing sheet so that the above-mentioned tacky adhesive material layer becomes a layer constituted of the pressure sensitive adhesive according to the present invention imparted with the prescribed characteristics, whereby the polarizing plate having a pressure sensitive adhesive is obtained.

Examples of the releasing sheet include plastic film such as polyester film made of polyethylene terephthalate, polyethylene naphthalate or the like; polyolefin film such as polypropylene, polyethylene or the like, which plastic film is coated with a releasing agent such as silicone resin so as to form a releasing layer. The thickness of the releasing sheet is not specifically limited, but is usually about 20 to 150 μm.

The tacky adhesive material and the irradiation conditions of an active energy beam are same as those already described in foregoing pressure sensitive adhesive for polarizing plates according to the present invention.

As a method for forming a tacky adhesive material layer on a releasing sheet, there is usable a method wherein a tacky adhesive material is applied as coating to the releasing sheet by means of bar coat method, knife coat method, roll coat method, blade coat method, die coat method, gravure coat method or the like method to form a coat and then dry the coat. The drying condition is not specifically limited, but usually includes a temperature of 50 to 150° C. and a drying time of 10 seconds to 10 minutes, approximately.

In the case of the constitution as illustrated in FIG. 2 the polarizing plate is composed frequently of only a polarization film, while the thickness of a layer comprising a pressure sensitive adhesive for polarizing plates is same as the foregoing. The process for producing a polarizing plate which is having a pressure sensitive adhesive and has a constitution as illustrated in FIG. 2 needs only to be a process enabling to obtain a layer wherein the pressure sensitive adhesive according to the present invention is formed on a polarizing plate without specific limitation. The polarizing plate having a pressure sensitive adhesive can be efficiently produced by the above-stated process according to the present invention.

In the case of the constitution as illustrated in FIG. 2, by producing in advance a pressure sensitive adhesive sheet wherein a pressure sensitive adhesive for polarizing plate is put between two releasing sheets so as to be in contact with the side of the releasing layers, and by using the resultant pressure sensitive adhesive sheet, the polarizing plate and phase difference plate can be stuck on each other. In the case of using the pressure sensitive adhesive component as a component (B), the pressure sensitive adhesive may be put between two releasing sheets and thereafter irradiated with an active energy beam. Alternatively, the pressure sensitive adhesive may be formed on either of the releasing sheets, irradiated with an active energy beam and thereafter sandwiched between both the releasing sheets. The irradiation conditions of an active energy beam are selected so as to form the layer constituted of the pressure sensitive adhesive according to the present invention imparted with the foregoing prescribed characteristics.

In the case of producing an optical film according to the present invention by the use of the pressure sensitive adhesive sheet, the releasing sheet of the pressure sensitive adhesive sheet is peeled off, and the polarizing plate is stuck by a usual method.

The working effects and advantages of the present invention are summarized in the following. The pressure sensitive adhesive for polarizing plates according to the present invention is preferably applied to polarizing plates, particularly to a polarizing plate integrated with a visual field angle-expansion film or the like, or a polarizing plate that is laminated with a phase difference plate. The invention is characterized in that it is capable of sticking with high durability, the polarizing plate to a liquid crystal cell or a phase difference plate and in that a liquid crystal display unit to be obtained is less liable to cause light leakage even in an environment of high temperature and high humidity. It also provides the polarizing plate having the pressure sensitive adhesive, a process for producing the polarizing plate, an optical film and a process for producing the optical film.

In what follows, the present invention will be described in more detail with reference to comparative examples and working examples, which however shall never limit the present invention thereto.

The performance of the pressure sensitive adhesive and the performance of the polarizing plate having a pressure sensitive adhesive which were obtained in Examples 1 to 6 and Comparative Examples 1 were determined by the procedures as described hereunder.

(1) Storage Elastic Modulus of Pressure Sensitive Adhesive

Storage elastic modulus of pressure sensitive adhesive at 23° C. and 80° C. is measured according to the method stated in the text of this specification.

(2) Adhesive Strength (Adhesive Strength for Alkali-Free Glass)

A sample measuring 25 mm in width and 100 mm in length is cut off from a polarizing plate having a pressure sensitive adhesive, a releasing sheet is peeled off (thickness of the pressure sensitive adhesive layer being 25 μm), the sample is stuck on alkali-free glass (manufactured by Corning Incorporated under the trade name "1737"), then the sample is pressurized in an autoclave (manufactured by Kurihara Manufactory Inc.) under the conditions of 0.5 MPa, 50° C. and 20 minutes, it is allowed to stand in an environment of 23° C. and 50% RH for 24 hours, and thereafter the adhesive strength is measured under the conditions of peeling velocity being 300 mm/min and peeling angles being 180 degrees by the use of a tensile strength tester (manufactured by Orientic Corporation under the trade name "Tensilon")

(3) Durability of Polarizing Plate Having a Pressure Sensitive Adhesive

A polarizing plate having a pressure sensitive adhesive is regulated to a rectangular size of 233 mm by 309 mm by the use of a cutting machine (manufactured by OGINO SEIKI CO., LTD. under the trade name "Super Cutter [PN 1-600]"), then the sample of the polarizing plate is stuck on alkali-free glass (manufactured by Corning Incorporated under the trade name "1737"), thereafter the sample is pressurized in an autoclave (manufactured by Kurihara Manufactory Inc.) under the conditions of 0.5 MPa, 50° C. and 20 minutes. Then it is placed in an environmental conditions of each of the under-mentioned conditions of durability, and after the lapse of 200 hours observation is made by means of a magnifier (lupe) with 10 magnification to evaluate the durability on the basis of the following criterion.

◯: no defect at a distance of 0.6 mm or more perpendicularly from any of peripheral end in four sides X: abnormality and/or defect of 0.1 mm or larger or longer in appearance such as lifting, peeling off, foaming or streak being observed at a distance of 0.6 mm or more perpendicularly from peripheral end in any of four sides <Durable Conditions>

60° C., RH of 90% environment; 80° C., 90° C. and 200 cycles of heat shock test for 30 minutes each in an environmental conditions from—20° C. to 60° C.

(4) Light Leakage Test

A polarizing plate having a pressure sensitive adhesive is regulated to a rectangular size of 233 mm by 309 mm by the use of a cutting machine (manufactured by OGINO SEIKI CO., LTD. under the trade name "Super Cutter [PN1-600]"), then the sample of the polarizing plate is stuck on alkali-free glass (manufactured by Corning Incorporated under the trade name "1737") so that the polarization axis of the polarizing plate having a pressure sensitive adhesive becomes cross nicol state on both the front and rear sides of the alkali-free glass, thereafter the sample is pressurized in an autoclave (manufactured by Kurihara Manufactory Inc.) under the conditions of 0.5 MPa, 50° C. and 20 minutes. Then it is allowed to stand in this state at 80° C. for 200 hours, thereafter allowed to stand in an environmental conditions of 23° C., and RH of 50% for 2 hours to evaluate the light leakage properties on the basis of the following criterion.

Figure 3:
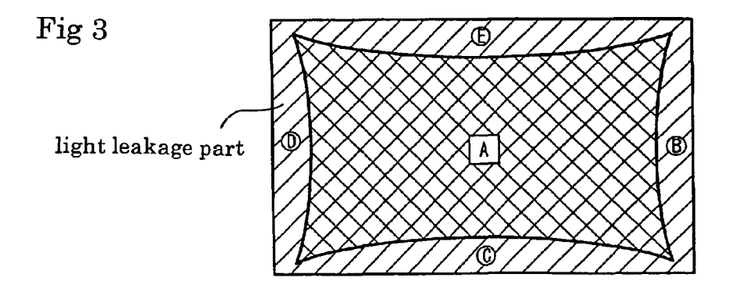
FIG. 3 is an explanatory drawing showing a method for evaluating light leakage from the polarizing plate obtained in example and comparative examples, in which the symbols shall have each the following designation.

By the use of a measuring apparatus (manufactured by OTSUKA ELECTRONICS CO., LTD. under the trade name MCPD-2000), measurements are made of the lightness for each region as illustrated in FIG. 3 and also of lightness difference ΔL* from the following formula to determine light leakage properties.

$$\Delta L^* = [(b+c+d+e)/4] - a$$

where a, b, c, d and e each are lightness at a preliminary prescribed measuring point in the regions A, B, C, D and E (one point in the central part in each of the regions). It means that light leakage decreases with a decrease in the value of ΔL*.

Examples 1 to 6 & Comparative Example 1

Tacky adhesive materials (a) having chemical compositions as given in Table 1 were prepared, and applied as coating onto the releasing layer of a polyethylene terephthalate-made releasing film (manufactured by LINTEC Corporation. under the trade name "SP-PET 3811") having 38 μm thickness as the releasing sheet with a knife type coating machine so as to obtain 25 μm thickness after drying. Thereafter, the materials thus coated were dry treated at 90° C. for one minute to form tacky adhesive material layers.

Subsequently polarizing plates which were composed each of a polarization film having discotic liquid crystal layer and in which the polarization film and a visual field angle-expansion film were integrated with each other were stuck so that the tacky adhesive material layers each come into contact with the discotic liquid crystal layer. After the lapse of 30 minutes from the sticking, the tacky adhesive material thus stuck were irradiated with ultraviolet (UV) ray from the side of releasing films under the following conditions to prepare polarizing plates each having the pressure sensitive adhesive.

<Conditions of Irradiation with UV>

An electrodeless lamp—H valve (manufactured by Fusion Co., Ltd.) was used.

Illuminance of 600 mW/cm$^2$, light quantity of 150 mJ/cm$^2$

There were used UV, lightness and an actinometer that were manufactured by EYEGRAPHICS Co, Ltd. under the trade name "UVPF-36".

Table 2 gives the evaluation results for the performances of the pressure sensitive adhesives and the performances of the polarizing plates each having the pressure sensitive adhesive.

TABLE 1

| | Chemical composition of tacky adhesive material (a) (parts by mass) | | | | | |
|---|---|---|---|---|---|---|
| | Acrylic copolymer | Multi-functional acrylate based monomer (B) | | Photopolymerization initiator[5] | Isocyanate based cross linking agent (C)[6] | Silane coupling agent (D)[7] |
| | (A)[4] | type | amount | | | |
| Example 1 | 100 | TMPTA[1] | 15 | 0.3 | 2 | 0.1 |
| Example 2 | 100 | TMPTA | 35 | 0.7 | 2 | 0.1 |
| Example 3 | 100 | M-315[2] | 15 | 0.3 | 2 | 0.1 |
| Example 4 | 100 | M-315 | 35 | 0.7 | 2 | 0.1 |
| Example 5 | 100 | DPHA[3] | 7.5 | 0.15 | 2 | 0.1 |
| Example 6 | 100 | DPHA | 15 | 0.3 | 2 | 0.1 |
| Comparative Example 1 | 100 | — | 0 | 0 | 2 | 0.1 |

{Remarks}
[1]TMPTA: trimethylolpropane triacrylate having a molecular weight of 296, trifunctional type (manufactured by Sartomer Company, Inc. under the trade name "KS-TMPTA")
[2]M-315: tris(acryloxyethyl) isocyanurate having a molecular weight of 423.3, trifunctional type (manufactured by TOAGOSEI Co., Ltd. under the trade name "Aronix M-315")
[3]DPHA: dipentaerythritol hexaacrylate having a molecular weight of 578.6, hexafunctional type (manufactured by NIPPON KAYAKU Co., Ltd. under the trade name "KAYARAD DPHA")
[4]Acrylic copolymer:butyl acrylate, methyl acrylate and acrylic acid at a proportion by mass of 77:20:3 being polymerized by a conventional process, the copolymer having a molecular weight of 800,000
[5]Photopolymerization initiator:mixture of benzophenone and 1-hydroxy cyclohexylphenyl ketone at a proportion by mass of 1:1 (manufactured by Chiba Specialty Chemicals Co., Ltd. under the trade name "Irgacure 500")
[6]Isocyanate based crosslinking agent: trimethylolpropane-modified tolylenediisocyanate (manufactured by NIPPON POLYURETHANE INDUSTRY CO., LTD. under the trade name: Colonate L)
[7]Silane coupling agent: 3-glycidoxypropyltrimethoxysilane (manufactured by Shin-Etsu Chemical Co., Ltd. under the trade name "KBM-403")

TABLE 2

| | Performance of pressure sensitive adhesive | | | Performance of polarization plate having pressure sensitive adhesive | | | | |
|---|---|---|---|---|---|---|---|---|
| | Storage elastic modulus (MPa) | | Adhesive strength | Durability | | | | Light leakage performance |
| | 23° C. | 80° C. | (N/25 mm) | 60° C. 90% RH | 80° C. | 90° C. | heat shock | (ΔL*) |
| Example 1 | 0.54 | 0.46 | 24.0 | ◯ | ◯ | ◯ | ◯ | 1.33 |
| Example 2 | 8.72 | 2.67 | 21.0 | ◯ | ◯ | ◯ | ◯ | 0.54 |
| Example 3 | 0.67 | 0.53 | 19.0 | ◯ | ◯ | ◯ | ◯ | 0.39 |
| Example 4 | 10.3 | 3.20 | 2.0 | ◯ | ◯ | ◯ | ◯ | 0.37 |

TABLE 2-continued

|  | Performance of pressure sensitive adhesive | | Performance of polarization plate having pressure sensitive adhesive | | | | |
|---|---|---|---|---|---|---|---|
|  | Storage elastic modulus (MPa) | | Adhesive strength | Durability | | | Light leakage performance |
|  | 23° C. | 80° C. | (N/25 mm) | 60° C. 90% RH | 80° C. | 90° C. | heat shock | (ΔL*) |
| Example 5 | 0.37 | 0.35 | 26.3 | ○ | ○ | ○ | ○ | 2.20 |
| Example 6 | 3.45 | 3.02 | 10.3 | ○ | ○ | ○ | ○ | 1.41 |
| Comparative Example 1 | 0.2 | 0.09 | 28.0 | ○ | ○ | ○ | ○ | 4.00 |

Example 7

Preparation of Polarization Plate Having a Pressure Sensitive Adhesive

A tacky adhesive material (a) having chemical composition as given in Table 3 was prepared, and applied as coating onto the releasing layer of a polyethylene terephthalate-made releasing film (manufactured by LINTEC Corporation under the trade name "SP-PET 3811") having 38 μm thickness as the releasing sheet with a knife type coating machine so as to obtain 25 μm thickness after drying. Thereafter, the materials thus coated were dry treated at 90° C. for one minute to form a tacky adhesive material layer.

Subsequently a polarizing plate which was composed of a polarization film and a tacky adhesive material layer were stuck on each other, and after 30 minutes from the sticking the polarizing plate thus stuck was irradiated with ultraviolet (UV) ray from the side of releasing film to prepare a polarization plate having the pressure sensitive adhesive. Irradiation Conditions of ultraviolet (UV) ray were the same as those in Example 1. Thereafter the polarizing plate was matured for 10 days under the conditions of 23° C. and 50% RH.

<The Pressure Sensitive Adhesive Rocessing for Phase Difference Plate>

Pressure sensitive adhesive (b) was applied as coating on the releasing layer of a polyethylene terephthalate-made releasing film (manufactured by LINTEC Corporation under the trade name "SP-PET 3811") having 38 μm thickness as the releasing sheet, with a knife type coating machine so as to obtain 25 μm thickness after drying. Thereafter, the film thus coated was dry treated at 90° C. for one minute to form a pressure sensitive adhesive layer.

The pressure sensitive adhesive (b) used therein was composed of 100 parts by mass of base material consisting of the copolymer of butyl acrylate and acrylic acid at a ratio of 95/5 which was blended with 0.3 part by mass of trimethylolpropane-modified tolylenediisocyanate (manufactured by NIPPON POLYURETHAN INDUSTRY CO., LTD. under the trade name: Colonate L) as a isocylanate based crosslinking agent and with 0.03 part by mass of 3-glycidoxypropyltrimethoxysilane (manufactured by Shin-Etsu Chemical Co., Ltd. under the trade name "KBM-403") as a silane coupling agent. As a phase difference plate, use was made of a polycarbonate film on which was stuck the pressure sensitive adhesive layer.

<Preparation of Optical Film>

The releasing film of the polarizing plate having the pressure sensitive adhesive was peeled off, and the polarizing plate was stuck on the phase difference plate subjected to pressure sensitive adhesive processing on the side of non-pressure sensitive adhesive processing.

The evaluation methods for the polarizing plate having the pressure sensitive adhesive and optical film each in Examples 7 to 10 and Comparative Example 2 are described hereunder.

<Evaluation Methods>

(1) Storage elastic modulus of pressure sensitive adhesive: the above-stated method was used.

(2') Adhesive strength (adhesive strength for polycarbonate)

A sample measuring 25 mm in width and 100 mm in length was cut from the polarizing plate having the pressure sensitive adhesive, the releasing sheet was peed off (thickness of pressure sensitive adhesive layer being 25 μm), the sample was stuck on polycarbonate (manufactured by TEIJIN CHEMICALS LTD. under the trade name "Pure Ace 110-100"), and thereafter was pressurized under the conditions of 0.5 MPa and 50° C. for 20 minutes by the use of an autoclave manufactured by Kurihara Manufactory Inc. Then was allowed to stand in an environment of 23° C. and 50% RH for 168 hours. Subsequently adhesive strength was measured under the conditions of peeling velocity being 300 mm/min and peeling angle being 180 degrees by the use of a tensile strength machine (manufactured by Orientec Co., Ltd. under the trade name "Tensilon").

(3') Durability of optical film: the method same as in item (3) was used.

(4') Light leakage performance: the method same as in item (4) was used.

(5) Gel fraction

A sample of pressure sensitive adhesive having a thickness of 25 μm measuring 80 mm by 80 mm was wrapped with a polyester made mesh (mesh size of 200), and the pressure sensitive adhesive only was weighed with a precision balance to obtain the weight being M1. The pressure sensitive adhesive was immersed in ethyl acetate by the use of a Soxhlet extractor under refluxing to treat for 16 hours. Thereafter the pressure sensitive adhesive was taken out, air-dried in an environment of 23° C. and 50% RH for 24 hours and further dried for 12 hours in an autoclave at 80° C., the pressure sensitive adhesive only after drying was weighed with a precision balance to obtain the weight being M2. Thus the gel fraction is represented by the formula (M2/M1)×100%.

Examples 8 & 9

The procedure in Example 7 was repeated to prepare a polarizing plate having the pressure sensitive adhesive and an optical film except that the tacky adhesive material (a) was blended as shown in Table 3. The results which were evaluated in the same manner as described in Example 7, are given in Table 4.

Example 10

A tacky adhesive material (a) having chemical compositions as given in Table 3 was prepared, and applied as coating onto the releasing layer of a polyethylene terephthalate made releasing film (manufactured by LINTEC Corporation under the trade name "SP-PET 3811") having 38 μm thickness as the releasing sheet with a knife type coating machine so as to obtain 25 μm thickness after drying. Thereafter, the material was dry treated at 90° C. for one minute to form a tacky adhesive material layer. A polyethylene terephthalate-made releasing film (manufactured by LINTEC Corporation under the trade name "SP-PET 381110") having 38 μm thickness was superimposed on the resultant tacky adhesive material layer. After 30 minutes from the superimposing the releasing film thus superimposed was irradiated with ultraviolet (UV) ray from the side of releasing film (SP-PET 3811) under the conditions same as in Example 1.

Subsequently the irradiated pressure sensitive adhesive was matured for 10 days under the conditions of 23° C. and 50% RH.

In the evaluation of the resultant products, releasing film (SP-PET 381110) was peeled off, the pressure sensitive adhesive was stuck on the polarizing plate to prepare a polarizing plate having the pressure sensitive adhesive. In addition, in the same manner as in Example 7, adhesive processing of a phase difference plate was performed, and an optical film was prepared. The results of evaluation therefor are given in Table 4.

Comparative Example 2

The procedure in Example 7 was repeated to prepare a polarizing plate having the pressure sensitive adhesive and an optical film except that the tacky adhesive material (a) was blended as shown in Table 3. The results are given in Table 4.

TABLE 4-1

| | Performance of pressure sensitive adhesive | | | |
|---|---|---|---|---|
| | Storage elastic modulus (MPa) | | Adhesive strength | |
| | 23° C. | 80° C. | (N/25 mm) | Gel fraction (%) |
| Example 7 | 1.47 | 0.52 | 20 | 95 |
| Example 8 | 10.1 | 2.72 | 25 | 97 |
| Example 9 | 1.95 | 0.63 | 16 | 94 |
| Example 10 | 1.47 | 0.52 | 20 | 95 |
| Comparative Example 2 | 0.085 | 0.062 | 8 | 80 |

TABLE 4-2

| | Performance of polarizing plate having pressure sensitive adhesive | | | | Light leakage |
|---|---|---|---|---|---|
| | Durability | | | | performance |
| | 60° C. 90% RH | 80° C. | 90° C. | heat shock | {$\Delta L^*$} |
| Example 7 | ○ | ○ | ○ | ○ | 0.85 |
| Example 8 | ○ | ○ | ○ | ○ | 0.5 |
| Example 9 | ○ | ○ | ○ | ○ | 1.0 |
| Example 10 | ○ | ○ | ○ | ○ | 0.8 |
| Comparative Example 2 | ○ | ○ | ○ | X | 6.5 |

What is claimed is:

1. A pressure sensitive adhesive for polarizing plates which has a storage elastic modulus (G') at 23° C. of at least 0.3 MPa, comprising a tacky adhesive material that comprises (A) an acrylic copolymer and (B) an active energy beam-curable compound, said tacky adhesive material having been irradiated with an active energy beam, wherein:
- (B) is a multi-functional (meth)acrylate having a molecular weight of less than 1,000,
- said acrylic copolymer further comprises 0.01 to 10% by mass of a monomer bearing a crosslinkable functional group,
- the ratio by mass of component (A) to component (B) is 100:1 to 100:40,
- the tacky adhesive material further comprises a crosslinking agent (C) and a silane coupling agent (D), and

TABLE 3

| | Chemical composition (parts by mass) of tacky adhesive material | | | | | |
|---|---|---|---|---|---|---|
| | Acrylic copolymer (A) | | Multi-functional acrylic monomer (B) | | Photopolymerization | Isocyanate base cross-linking | Silane coupling agent |
| | type | amount | type | amount | initiator[5] | agent (C)[6] | (D)[7] |
| Example 7 | A1[8] | 100 | M-315[2] | 15 | 1.5 | 1 | 0.2 |
| Example 8 | A1[8] | 100 | M-315 | 30 | 1.5 | 1 | 0.2 |
| Example 9 | A1[8] | 100 | R-684[10] | 25 | 1.5 | 1 | 0.2 |
| Example 10 | A1[8] | 100 | M-315 | 15 | 1.5 | 1 | 0.2 |
| Comparative Example 2 | A2[9] | 100 | — | — | — | 1 | 0.2 |

{Remarks}
[8]A1 (acrylic copolymer) having a weight average molecular weight of 1,500,000 obtained by polymerizing butyl acrylate and acrylic acid at a ratio by mass of 95:5 according to a conventional process
[9]A2 (acrylic copolymer) having a weight average molecular weight of 1,200,000 obtained by polymerizing butyl acrylate and 2-hydroxyethyl acrylate at a ratio by mass of 99:1 according to a conventional process
[10]R-684: tricyclo-decanedimethanol acrylate (manufactured by NIPPON KAYAKU Co., Ltd. under the trade name "KAYARAD R-684")

said pressure sensitive adhesive has an adhesive strength for polycarbonate of at least 5 N/25 mm.

2. The pressure sensitive adhesive for polarizing plates as set forth in claim 1, which has a storage elastic modulus (G') at 23° C. in the range of 0.3 to 15 MPa.

3. The pressure sensitive adhesive for polarizing plates as set forth in claim 1 or 2, which has a storage elastic modulus (G') at 80° C. of at least 0.3 MPa.

4. The pressure sensitive adhesive for polarizing plates as set forth in claim 3, which has a storage elastic modulus (G') at 80° C. in the range of 0.3 to 10 MPa.

5. The pressure sensitive adhesive for polarizing plates as set forth in claim 1, wherein the multi-functional (meth) acrylate based monomer has a cyclic structure.

6. An article of manufacture comprising a polarizing plate stuck on a liquid crystal glass cell with the pressure sensitive adhesive as set forth in claim 1.

7. The pressure sensitive adhesive for polarizing plates as set forth in claim 1, which has an adhesive strength for alkali-free glass of at least 0.2 N/25 mm.

8. The pressure sensitive adhesive for polarizing plates as set forth in claim 1, which has a gel fraction of at least 85%.

9. A polarizing plate having a pressure sensitive adhesive as set forth in claim 1 provided on the polarizing plate.

10. A process for the production of the polarizing plate having a pressure sensitive adhesive as set forth in claim 9, which comprises sticking a polarizing plate on a layer of said tacky adhesive material formed on a releasing layer of a releasing sheet, and thereafter irradiating the tacky adhesive material with an active energy beam from the releasing sheet side.

11. An optical film which comprises a polarizing plate and a phase difference plate, wherein said polarizing plate and said phase difference plate are stuck on each other with the pressure sensitive adhesive as set forth in claim 1.

12. A pressure sensitive adhesive sheet which comprises two releasing sheets, wherein the pressure sensitive adhesive for polarizing plates as set forth in claim 1 is located between said two releasing sheets so as to be in contact with releasing layer sides thereof.

13. A process for the production of an optical film, which comprises sticking a polarizing plate and a phase difference plate to one another with the pressure sensitive adhesive sheet as set forth in claim 12.

14. The article of manufacture as set forth in claim 6, wherein the polarizing plate is constituted of a polarization film and a visual field angle expansion film that are integrated with each other.

15. An article of manufacture comprising a polarizing plate stuck on a phase difference plate with the pressure sensitive adhesive as set forth in claim 1.

16. The pressure sensitive adhesive for polarizing plates as set forth in claim 1, wherein (A) is a (meth)acrylic ester based copolymer having a weight average molecular weight of 600,000 to 2,000,000.

17. The pressure sensitive adhesive for polarizing plates as set forth in claim 1, wherein (A) is an acrylic copolymer comprising at least one monomer unit selected from the group consisting of methyl(meth)acrylate, ethyl(meth)acrylate, propyl(meth)acrylate, butyl(meth)acrylate, pentyl(meth)acrylate, hexyl(meth)acrylate, cyclohexyl(meth)acrylate, 2-ethylhexyl(meth)acrylate, isooctyl(meth)acrylate, decyl (meth)acrylate, dodecyl(meth)acrylate, myristyl(meth)acrylate, palmityl(meth)acrylate and stearyl(meth)acrylate.

18. The pressure sensitive adhesive for polarizing plates as set forth in claim 1, wherein (B) is at least one selected from the group consisting of 1,4-butanediol di(meth)acrylate, 1,6-hexanediol di(meth)acrylate, neopentylglycol di(meth)acrylate, polyethyleneglycol di(meth)acrylate, neopentylglycoladipate di(meth)acrylate, hydroxypivalic acid neopentylglycol di(meth)acrylate, dicyclopentanyl di(meth)acrylate, caprolactone-modified dicyclopentenyl di(meth)acrylate, ethylene oxide-modified phosphoric acid di(meth)acrylate, di(acryloxyethyl)isocyanurate, allylated cyclohexyl di(meth)acrylate, dimethyloldicyclopentane diacrylate, ethylene oxide-modified hexahydrophthalic acid diacrylate, tricyclodecane dimethanol acrylate, neopentyl glycol-modified trimethylolpropane diacrylate, adamantane diacrylate, trimethylolpropane tri(meth)acrylate, dipentaerythritol tri(meth)acrylate, propionic acid-modified dipentaerythritol tri(meth)acrylate, pentaerythritol tri(meth)acrylate, propylene oxide-modified trimethylolpropane tri(meth)acrylate, tris (acryloxyethyl)isocyanurate, diglycerine tetra(meth)acrylate, pentaerythritol tetra(meth)acrylate, propionic acid-modified dipentaerythritol penta(meth)acrylate, caprolactone-modified dipentaerythritol hexa(meth)acrylate, di(acryloxyethyl)isocyanurate, tris(acryloxyethyl)isocyanurate, dimethyloldicyclopentane diacrylate, ethylene oxide-modified hexahydrophthalic acid diacrylate, tricyclodecane dimethanol acrylate, neopentyl glycol-modified trimethylolpropane diacrylate and adamantane diacrylate.

19. The pressure sensitive adhesive for polarizing plates as set forth in claim 18, wherein (A) is an acrylic copolymer comprising at least one monomer unit selected from the group consisting of methyl(meth)acrylate, ethyl(meth)acrylate, propyl(meth)acrylate, butyl(meth)acrylate, pentyl(meth)acrylate, hexyl(meth)acrylate, cyclohexyl(meth)acrylate, 2-ethylhexyl(meth)acrylate, isooctyl(meth)acrylate, decyl (meth)acrylate, dodecyl(meth)acrylate, myristyl(meth)acrylate, palmityl(meth)acrylate and stearyl(meth)acrylate.

20. The pressure sensitive adhesive for polarizing plates as set forth in claim 1, wherein the active energy beam is UV radiation.

21. The pressure sensitive adhesive for polarizing plates as set forth in claim 19, wherein the active energy beam is UV radiation.

22. The pressure sensitive adhesive for polarizing plates as set forth in claim 1, which has an adhesive strength for polycarbonate of 10 to 50 N/25 mm.

23. The pressure sensitive adhesive for polarizing plates as set forth in claim 1, which has an adhesive strength for polycarbonate of 10 to 50 N/25 mm.

24. The pressure sensitive adhesive for polarizing plates as set forth in claim 1, wherein the ratio by mass of (A) to (B) is 100:10 to 100:40.

* * * * *